(12) United States Patent
Yalagandula et al.

(10) Patent No.: US 8,391,289 B1
(45) Date of Patent: Mar. 5, 2013

(54) MANAGING A FORWARDING TABLE IN A SWITCH

(75) Inventors: Praveen Yalagandula, Redwood City, CA (US); Jayaram Mudigonda, San Francisco, CA (US); Naveenam Padmanabha Lakshminarasimhan, Karnataka (IN); Reddy Sreedhar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 212 days.

(21) Appl. No.: 12/915,509

(22) Filed: Oct. 29, 2010

(51) Int. Cl.
*H04L 12/28* (2006.01)
(52) U.S. Cl. .................. 370/392; 370/400
(58) Field of Classification Search .......... 370/216, 370/217, 254, 389, 390, 392, 401
See application file for complete search history.

(56) References Cited

U.S. PATENT DOCUMENTS

| | | | |
|---|---|---|---|
| 7,525,973 B1 | 4/2009 | McRae | |
| 8,102,848 B1 * | 1/2012 | Rao | 370/390 |
| 8,139,492 B1 * | 3/2012 | Peterson et al. | 370/238 |
| 2005/0063407 A1 | 3/2005 | Wybenga et al. | |
| 2009/0052445 A1 | 2/2009 | Folkes | |
| 2009/0285089 A1 | 11/2009 | Srinivasan | |
| 2009/0303880 A1 | 12/2009 | Maltz et al. | |
| 2009/0303882 A1 | 12/2009 | Tanaka et al. | |
| 2009/0307334 A1 | 12/2009 | Maltz et al. | |
| 2010/0046531 A1 * | 2/2010 | Louati et al. | 370/401 |

OTHER PUBLICATIONS

Greenberg, Albert, Parantap Lahiri, David A. Maltz, Parveen Patel, and Sudipta Sengupta, "Towards a Next Generation Data Center Architecture: Scalability and Commoditization", < http://research.microsoft.com/en-us/um/people/dmaltz/papers/monsoon-presto08.pdf > Aug. 22, 2008.

* cited by examiner

*Primary Examiner* — Jung Park

(57) ABSTRACT

Managing a forwarding table in a switch of a computer network includes determining an entry in the forwarding table in a data plane in the switch to replace with a new entry to minimize a future flooding caused by a forwarding table miss of the forwarding table. The managing also includes storing a forwarding information base in the control plane, and the forwarding information base includes entries from the forwarding table.

20 Claims, 4 Drawing Sheets

MANAGING A FORWARDING TABLE IN A SWITCH

BACKGROUND

Ethernet switches maintain a forwarding table in a data plane to efficiently route packets. The forwarding table maps the destination addresses to one or more output ports. Upon receiving a packet from a source node S to a destination node D on a physical port p, a switch performs a lookup in the forwarding table for an address for D. If a match is found, then the packet is forwarded on the output port specified in the entry. If no entry is found, then the packet is flooded on all ports except the port p on which the packet is received. Other switches receiving the flooded packet may respond with information for forwarding the packet to its destination.

Typically switches fill a forwarding table through a learning mechanism. Upon receiving a packet from a source node S to a destination node D on a physical port p, a switch creates an entry in its forwarding table for source S with output as port p. If an entry already exists, then the switch refreshes the entry. Any entry that has not been refreshed in a specified "switch timeout period" is deleted from the forwarding table. Ethernet switches learn and maintain paths to each individual end-point separately, and forwarding tables grow linearly with the number of end-points.

Although today's commercial-off-the-shelf (COTS) switch supports a few thousand forwarding table entries, the forwarding tables are too small when the network is scaled to encompass thousands of servers, each with potentially tens of virtual machines. Typical switches support only few thousand entries. With virtualization, the number of MAC (Media Access Control) addresses seen even in a network of a thousand servers easily exceeds the forwarding table size. In addition, approaches that leverage VLANs (Virtual Local Area Network) to support multi-paths for high bisection bandwidth require multiple entries per destination MAC address in a switch. As a result of the small forwarding table size, more packets are flooded. This can lead to an unacceptably low performance and network breakdown.

BRIEF DESCRIPTION OF DRAWINGS

The embodiments are described in detail in the following description with reference to the following figures.

DETAILED DESCRIPTION OF EMBODIMENTS

Figure 1:
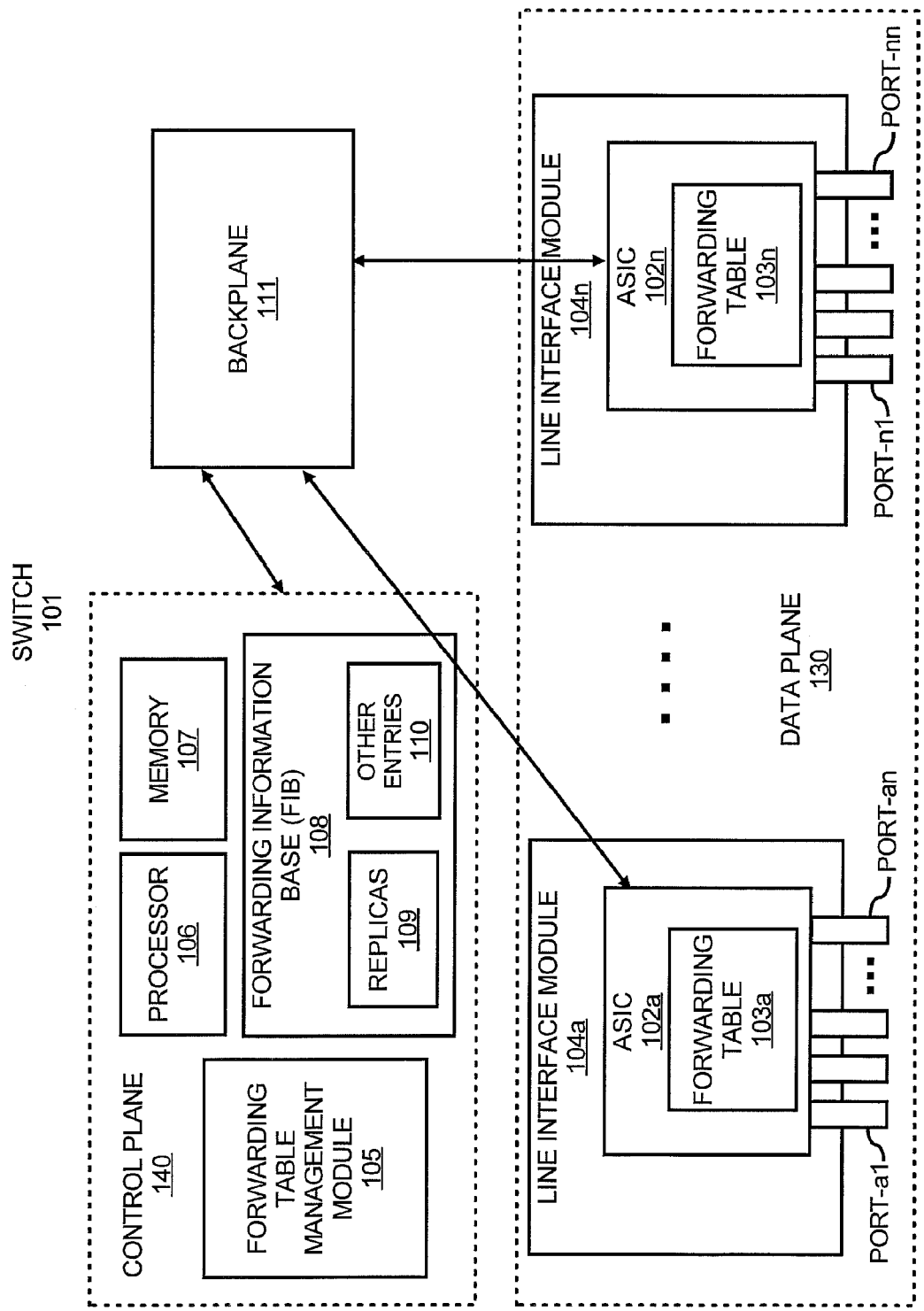
FIG. 1 illustrates a switch, according to an example of the present disclosure.

In the following description, numerous specific details are set forth to provide a thorough understanding of the embodiments. However, the embodiments may be practiced without limitation to these specific details. In other instances, well known methods and structures have not been described in detail to avoid unnecessarily obscuring the description of the embodiments. Also, the embodiments may be used together in various combinations.

A system and a method for managing a forwarding table in a switch are provided. The system and the method utilize a forwarding table in a data plane and a forwarding information base in a control plane including the entries in the forwarding table in the data plane. The forwarding table in the data plane has a subset of all the entries in the forwarding information base in the control plane. A forwarding table management module in the control plane identifies entries in the forwarding information base that are determined to be relevant to minimize flooding and manages the forwarding table in the data plane to include those entries. This may include substituting entries in the data plane with the entries considered relevant to minimize flooding.

The switch may include a layer 2 switch that uses flat addresses for routing. A flat address may include an address used within a domain, such as a MAC address for Ethernet. In one example, the flat address in its entirety may uniquely identify a node, which may be a source or a destination for routing. An IP address, on the other hand, is for global routing, which may extend across multiple domains, and is hierarchal. A flat address based network may include nodes not tied to their locations. For example, a flat address based network may include a virtualized environment where virtual machines are moved from one location to another and maintain the same address.

The forwarding table is provided on the data plane of the switch. A data plane is a forwarding plane. A data plane uses a forwarding table to determine information for forwarding an incoming packet towards its destination. For example, a look up is performed in the forwarding table using a destination address of the incoming packet and to retrieve an output port corresponding to the destination address. Then, the packet is transmitted from the output port to a next hop towards the destination. The forwarding information base is provided on the control plane of the switch. The information for entries in the forwarding table includes one or more entries for an address and an output port for packets. The forwarding table includes identification of which line card table an entry is stored in, and the entry may be stored in multiple line cards. A control plane is the part of the switch architecture. The control plane participates in routing protocols. The control plane monitors the traffic patterns and dynamically modifies contents of the forwarding table in the data plane and improves the overall performance of the network.

In an embodiment, a system and a method for managing forwarding tables in Ethernet switches provide control plane mechanisms to utilize a small forwarding table in a data plane by removing and installing forwarding table entries on demand. Thus, according to an example, the system and the method for managing small forwarding tables in Ethernet switches build networks with a large number of end host addresses by maintaining most useful entries to reduce floods while still learning host locations.

FIG. 1 illustrates a switch 101, according to an example of the present disclosure. It should be clearly understood that the switch 101 may include additional components and that some of the components described herein may be removed and/or modified without departing from a scope of the switch 101.

The switch 101 includes a data plane 130 and a control plane 140. The data plane 130 includes Application Specific Integrated Circuits (ASICs) 102*a*-102*n* in line interface modules 104*a*-104*n*. Each of the ASICs includes a forwarding table, such as forwarding tables 103*a*-103*n*. The forwarding table 103*a* maintains entries of end-points (either physical or virtual) for output ports and maps the destination addresses to one or more output ports, such as ports a1-*an* and ports n1-*nn*. The other forwarding tables also maintain entries for destination addresses.

The control plane 140 includes a forwarding table management module 105, a processor 106, a memory 107, a forwarding information base 108. The forwarding information base 108 further includes a replica 109 of the forwarding tables 103a-103n and other entries 110. The forwarding table management module 105 and other components of the system and functions and method described herein may be software or other machine readable instructions executed by a processor, such as the processor 106, or may be embodied as hardware or a combination of hardware and software. The processor 106 provides an execution platform for executing machine readable instructions embodying the methods and functions described herein. The machine readable instructions may be embodied or stored on a computer readable medium, which may be non-transitory, such as storage devices. The processor 106 manages any of the forwarding tables 103a-n and the forwarding information base 108. The memory 107 may be a main memory, such as a Random Access Memory (RAM), where software may reside during runtime. The memory 107 may also be a secondary memory. The secondary memory may include, for example, a nonvolatile memory where a copy of software is stored. In one example, the secondary memory also includes ROM (read only memory), EPROM (erasable, programmable ROM), EEPROM (electrically erasable, programmable ROM), and other data storage devices, include hard disks. The main memory or the secondary memory may store the forwarding information base 108. The information in an entry may include an address and an output port for the packet to be routed.

In addition, the control plane 140 and the line interface modules 104a-104n are connected to the backplane 111. The backplane 111 may include a switch fabric and power distribution plane distributing power to connected components.

The forwarding table management module 105 maintains the information for entries in the forwarding tables 103a-103n and in the forwarding information base 108. The entries in the forwarding tables 103a-103n in the data plane 130 are a subset of all entries in the forwarding information base 108. The forwarding table management module 105 may save the information for entries in the memory 107. In addition, the forwarding table management module 105 maintains the replica 109. The forwarding table management module 105 maintains the replica 109 inside or outside of forwarding information base 108. The replica 109 is a copy of the forwarding tables 103a-103n. The replica 109 mirrors up-to-date entries in the forwarding tables 103a-103n. Since the replica 109 mirrors entries in the forwarding tables 103a-103n, the forwarding table management module 105 may look up the replica 109 to determine information for entries in the forwarding tables 103a-103n. Using the replica 109, the forwarding table management module 105 may access the information for entries in the forwarding tables 103a-103n efficiently and promptly. The replica 109 may be included in the forwarding information base 108 with the other entries 110.

To maintain the information for entries in the forwarding tables 103a-103n, information for entries in the forwarding tables 103a-103n may be monitored. A replica of the forwarding table, such as the replica 109, may be updated based on the information for entries in the forwarding table so the replica 109 stores the same data or meta data identifying the same data that is in the corresponding forwarding table(s) 103a-103n. In addition, a determination as to whether there is an address for the destination of an incoming packet in the forwarding table may be made based on data in the replica 109.

In an example, the data plane 130 may send a lookup-failure packet to the control plane 140 when a forwarding table look up fails. A lookup-failure packet is a copy of the packet for which a forwarding table lookup for the destination address fails. In another example, the data plane 130 may send a learning packet, which in one example may be a packet whose source address is absent in the forwarding table. When the data plane 130 sends the learning packet, the data plane 130 may also send the metadata indicating the incoming port on which the packet was received.

The data plane 130 may provide an application program interface (API) to add and/or delete entries in the forwarding tables 103a-103n. The forwarding table management module 105 may update the forwarding information base 108 based on the learning packets received from the data plane 130 via the backplane 111. In an example, the forwarding table management module 105 may optionally receive information for entries in the forwarding information base 108 from other sources, such as a manual input, a central controller, and forwarding table managers on other switches.

Upon receiving a lookup-failure packet for a destination D from a line interface module, such as the line interface module 104a, the forwarding table management module 105 retrieves the information for the destination D from the forwarding information base 108. If there is no such entry in the forwarding information base 108, this processing may stop. Upon successful retrieval, the forwarding table management module 105 checks if there is an unused space in the forwarding table 103a. In an example, the forwarding table management module 105 may check if there is an unused space in the replica 109 to check if there is an unused space in the forwarding table 103a. If there is an unused space in the replica 109 or in the forwarding table 103a, the new entry may be inserted into the forwarding table 103a of the data plane 130. According to an example, the forwarding table management module 105 inserts the new entry into both the forwarding table 103a of the data plane 130 and into the replica 109 of the control plane 140. By inserting the new entry into both the forwarding table 103a of the data plane 130 and into the replica 109 of the control plane 140, the replica 109 always mirrors current entries in the forwarding tables 103a-103n.

If there is no unused space in the replica 109 or in the forwarding tables 103a, the forwarding table management module 105 decides whether to insert the new entry in the forwarding table 103a of the data plane 130 or not. If the forwarding table management module 105 decides to insert the new entry in the forwarding table 103a of the data plane 130, the forwarding table management module 105 further determines a candidate entry to remove from the forwarding table 103a of the data plane 130 to replace the candidate entry with the new entry in the forwarding table 103a. According to an example, the forwarding table management module 105 makes the decision of the candidate entry based on the weights or the priorities of the entries. If the weight of the new entry is lower than all other existing entries in the replica 109 or in the forwarding table 103a, this processing may stop. Otherwise, the lowest weighted entry in the forwarding table 103a of the data plane 130 may be chosen to be replaced by the new entry. The future flooding is minimized when the lowest weighted entry being replaced with the new entry is least useful in the future.

In an example, an entry's weight may be computed based on the following four properties of the entry: (i) the most recent usage time; (ii) a popularity; (iii) a number of learning packets received for the entry; (iv) an existence of a directly connected host for the entry. Other properties may be used. The most recent usage time is the last time when a lookup-failure packet was received for this entry. By way of example, the most recently used entry has the highest value and the least recently used entry has the lowest value. The popularity is the number of lookup-failure packets received for this entry. The existence of a directly connected host for the entry determines whether the entry corresponds to a directly connected host. In an example, an entry's weight may be computed based on a weighted sum of these four properties' values. The popularity and the most recent usage time of an entry may be computed based on the lookup-failure packets received for this entry. In an example, the data plane 130 tracks these statistics for each entry in the forwarding tables 103a-103n and exposes the API to retrieve them, thus, the forwarding table management module 105 may get these values via the API instead of depending on the lookup-failure packets.

Figure 2:
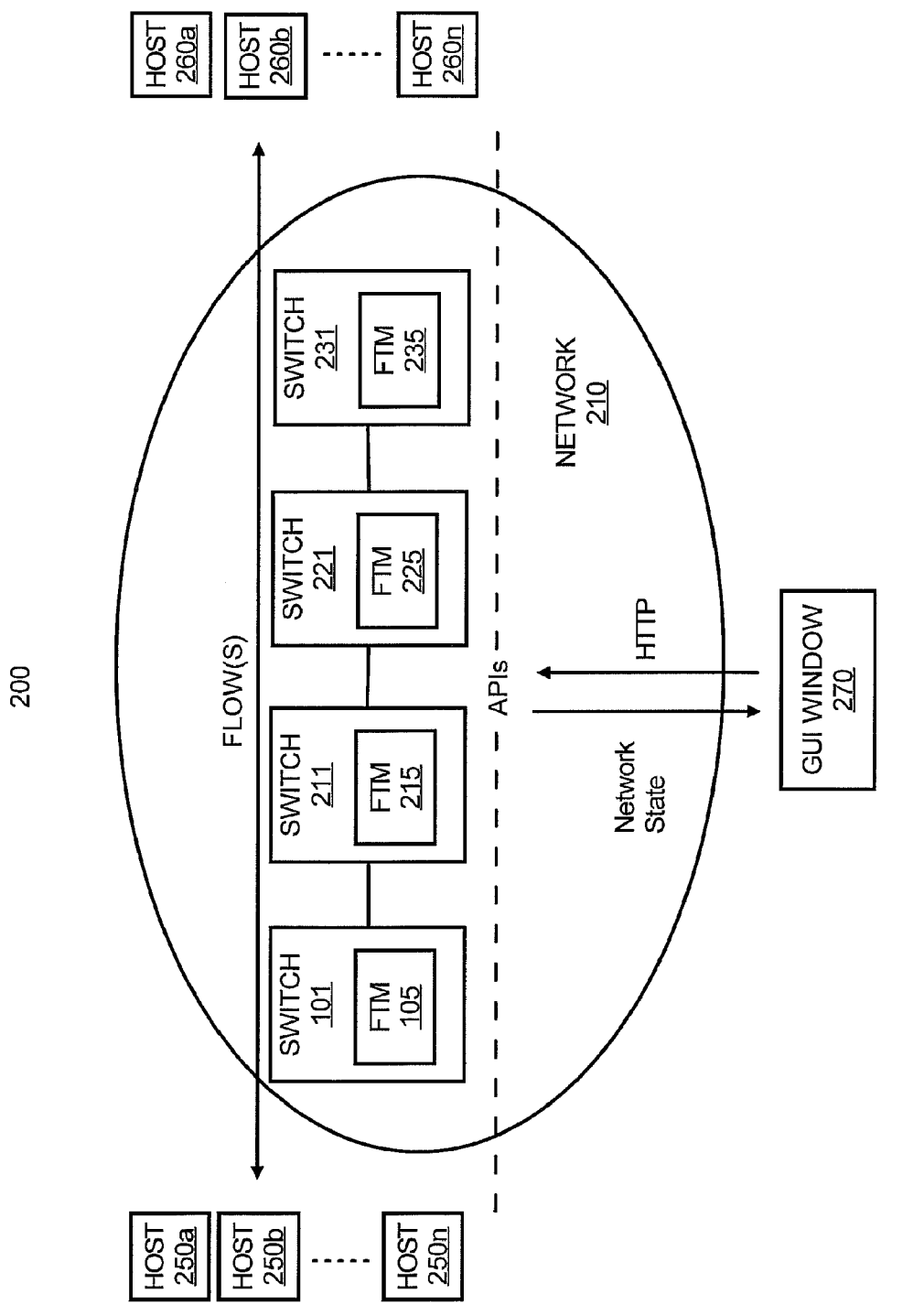
FIG. 2 illustrates a system for managing a forwarding table, according to an example of the present disclosure.

FIG. 2 illustrates a system 200 for managing a forwarding table, according to an example of the present disclosure. It should be understood that the system depicted in FIG. 2 may include additional components and that some of the components described herein may be removed and/or modified. Additionally, the system 200 may include any number of switches, end hosts, and other types of network devices, which may include any device that can connect to the network 210. Devices in the network are referred to as nodes, and may include network devices, such as switches, gateways, etc., or computer systems connected to the network, such as servers or end-user devices. Also, the system 200 may include source devices and destination devices.

With reference to FIG. 2, there is shown the switch 101, a switch 211, a switch 221, and a switch 231 in the network 210. The switch 101 includes the forwarding table management module (FTM) 105, the switch 211 includes a FTM 215, the switch 221 includes a FTM 225, and the switch 231 includes a FTM 235. All of the forwarding table management modules, FTM 215, FTM 225, and FTM 235 may operate the same or similar functions as that of the FTM 105. The system 200 also includes a plurality of hosts 250a-n and a plurality of hosts 260a-n. One or more of the hosts 250a-n and the hosts 260a-n may be source devices or destination devices. In addition, the system 200 includes a graphical user interface (GUI) window 270.

An interface used between the switches 101, 211, 221, and 231 and the GUI window 270 in FIG. 2 is application program interfaces (APIs). The APIs may include OpenFlow APIs or other routing protocol APIs. In an example, the control plane 140 learns the information for entries in the forwarding information base 108, via mechanisms such as manual input by a network administrator, computed by a local program, or computed and distributed by an external controller. For example, a network administrator may input information for entries in the forwarding information base 108 to the switch 101 using the GUI window 270.

According to an example, upon receiving a learning packet, each of the forwarding table managers, such as the forwarding table management module 105, extracts source address information and updates an entry of its forwarding information base, such as the forwarding information base 108, corresponding to the extracted source address information. By way of example, as shown in FIG. 1, since the replica 109 may also contain the entry corresponding to the extracted source address information, the forwarding table management module 105 may also update the replica 109. If the replica 109 does not contain the entry corresponding to the extracted source address information, the entry may be a new entry, and the forwarding table management module 105 may decide whether to insert the new entry into the forwarding tables 103a-103n.

If the forwarding table management module 105 does not insert the new entry into the forwarding tables 103a-103n, then the data plane 130 will continue forwarding all packets from that source to the control plane 140 as it may assume that the control plane 140 has not learned the source address. But if the forwarding table management module 105 decides to insert the new entry into the forwarding tables 103a-103n, then the forwarding table management module 105 may remove an existing entry in the forwarding tables 103a-103n. However, the existing entry to be removed in the forwarding table 103a may be a useful entry, and thus, may cause floods. Thus, according to an example, a learned packet counts may be included in computing the weights of the entries so that the weights are used by the forwarding table management module 105 to decide whether the new entry should be inserted into the forwarding tables 103a-103n or not. Here, computing the weights of the entries in the forwarding table may mean determining priorities of the entries in the forwarding table. Thus, through implementation of the method and the system disclosed herein, the forwarding table management module 105 manages small data plane forwarding table with the goal of maintaining most useful entries to reduce floods while still learning host locations.

An example of a method in which the system 200 may be employed for managing a forwarding table in a switch will now be described with respect to the flow diagrams of the methods 300 and 400 depicted in FIGS. 3 and 4. It should be apparent to those of ordinary skill in the art that the methods 300 and 400, and for other methods described herein that other steps may be added or existing steps may be removed, modified or rearranged. Also, the methods are described with respect to the system 200 by way of example and not limitation, and the methods may be used in other systems.

Figure 3:
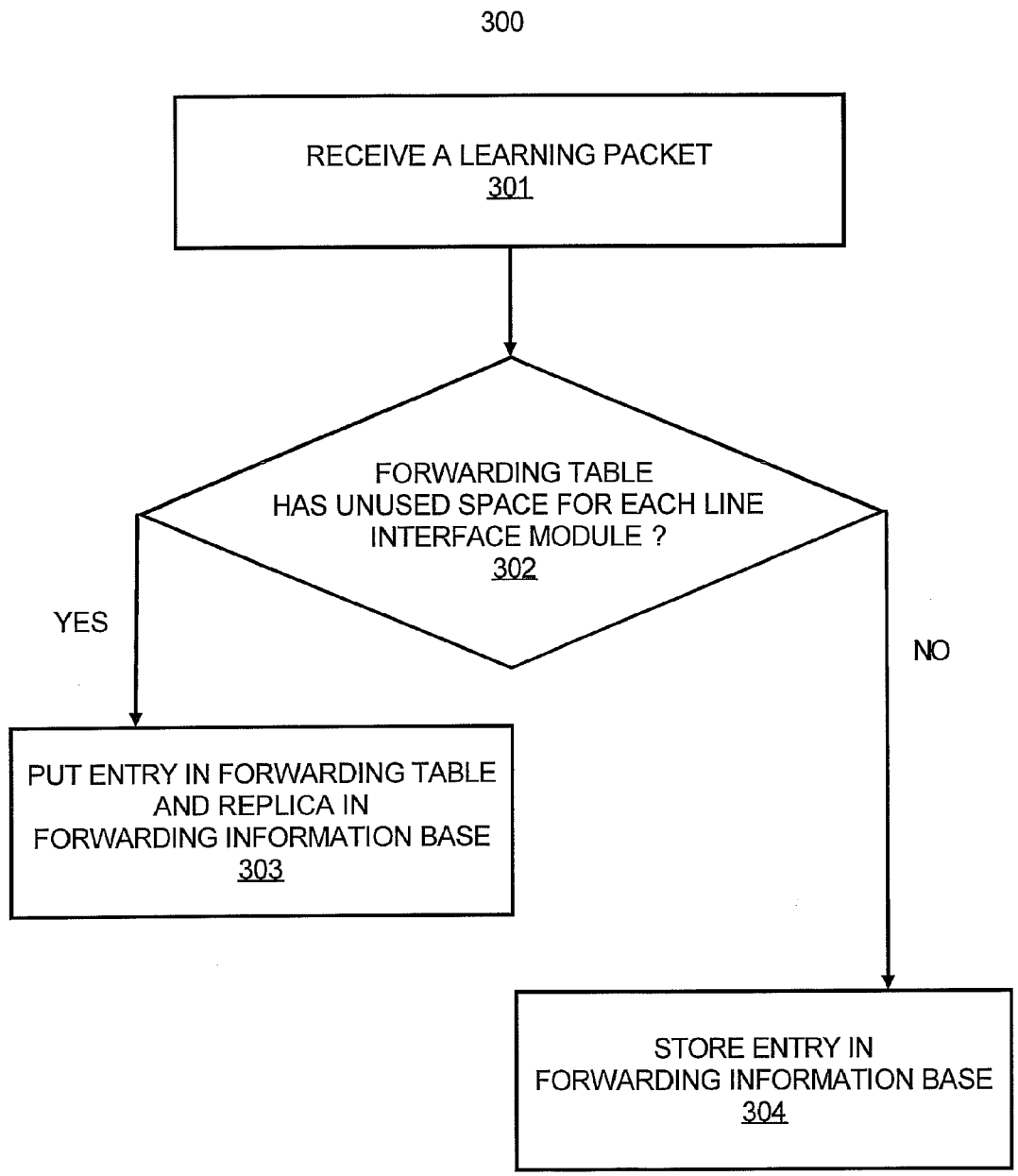
FIGS. 3 and 4 illustrate flow charts of methods for managing a forwarding table, according to an example of the present disclosure.

FIG. 3 illustrates a flowchart of a method 300 for managing forwarding tables in a switch when a learning packet is received. One or more of the steps of the method 300 may be performed by a computer system in a switch. The computer system may include the forwarding table management module 105 shown in FIG. 1 or another computer system.

At block 301, a learning packet is received. A learning packet may include any packet for which information about a source or destination can be determined. In one example, a source address is determined for an incoming learning packet. Also, an incoming port is determined for the learning packet. An entry may be created that indicates a destination address equal to the source address of the learning packet, and an outgoing port equal to the incoming port of the learning packet. The entry may be stored in the forwarding information base and/or forwarding table as described below.

At block 302, for each line interface module 104a-104n, a determination is made as to whether unused space exists in its forwarding table, such as the corresponding one of the forwarding table 103a-103n. Unused space includes space currently unused for storing an entry in the forwarding table. A forwarding table may have a maximum number of entries. If the number of entries is less than the maximum number, then there may be unused space.

At block 303, for each line interface module 104a-104n, if unused space exists in the forwarding table of the line interface module, an entry may be inserted in the forwarding table in the line interface module in the data plane 130 and the entry is inserted in the replica 109 in the control plane 140 (e.g., in the forwarding information base 108). In one example, the ASIC or other processing circuit on the line interface module updates the forwarding table. In another example, the forwarding tables 103a-103n are updated by the forwarding table management module 105 in the control plane 140. In another example, the control plane 140 sends the entry information to each of the line interface modules 104a-n, and each of the ASICs 102a-n a in each of the line interface modules 104*a*-*n* updates the forwarding tables 103*a*-103*n* under the instruction of the forwarding table management module 105.

At block 304, for each line interface module 104*a*-104*n*, if unused space does not exist in the forwarding tables 103*a*-*n* of the line interface modules 104*a*-*n*, then an entry may be stored in the forwarding information base 108 of the control plane 140 for future use, such as described with respect to the method 400. The blocks 302-304 are described with respect to determining whether to update the forwarding tables in each of the line interface modules by way of example. The blocks 302-304 may be performed for one or more of the forwarding tables in the line interface modules.

Figure 4:
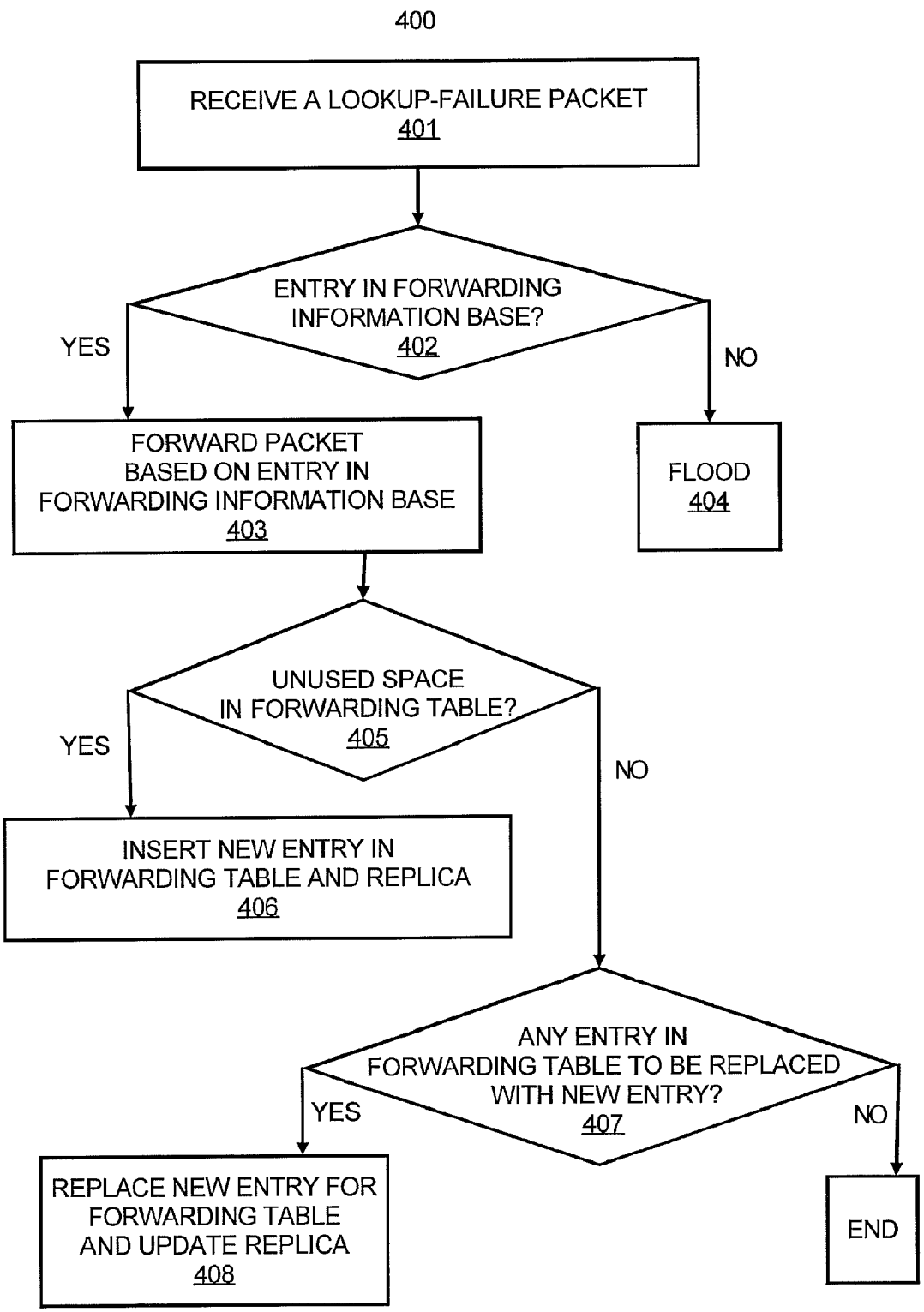

FIG. 4 illustrates a flowchart of a method 400 for managing forwarding tables in a switch based on a lookup failure. One or more of the steps of the method 400 may be performed by a computer system. The computer system may include the forwarding table management module 105 shown in FIG. 1 or another computer system.

At block 401, a lookup-failure packet is received at the control plane 140 from a line interface module (e.g., the line interface module 104*a*) in the data plane 130 when a forwarding table lookup fails in the line interface module 104*a* for an incoming packet. The forwarding table lookup failure is also referred to as a forwarding table miss, which occurs when an entry for an incoming packet cannot be found in the forwarding table. For example, information, such as an outgoing port, for forwarding the incoming packet cannot be determined from the forwarding table. The miss may result from not being able to identify an entry in the forwarding table that has a destination address matching the destination address of the incoming packet. The lookup failure packet may be a copy of an incoming packet or the original or information from the incoming packet, such as the destination address of the incoming packet, that can be used to perform a lookup in the forwarding information base 108. A notification of the lookup failure in the forwarding may be sent with the lookup failure packet or may be inferred from receipt of the lookup failure packet.

At block 402, the forwarding table management module 105 in the control plane 140 determines whether there is an entry in the forwarding information base 108 for the incoming packet based on information from the lookup failure packet. For example, a lookup is performed on the forwarding information base 108 using the destination address of the incoming packet to determine whether there is a corresponding entry.

At block 403, the incoming packet is forwarded if there an entry is found from the lookup performed on the forwarding information base 108. For example, the lookup on the forwarding information base 108 identifies an entry including an outgoing port. The forwarding table management module 105 notifies the line interface module 104*a* of the outgoing port, and the incoming packet is forwarded on the outgoing port. The notification may include sending the entry from the forwarding information base 108 to the line interface module 104*a*.

At block 404, the incoming packet is flooded if the lookup on the forwarding information base 108 fails. At block 404, the packet may be flooded if the line interface module 104*a* receives notification from the forwarding table management module 105 of the lookup failure on the forwarding information base 108 for the incoming packet. In other embodiments, the line interface module 104*a* may flood prior to receiving the notification from the forwarding table management module 105 or regardless of receiving the notification from the forwarding table management module 105. For example, if no notification is received from the forwarding table management module 105 within a period of time of sending the lookup failure packet to the control plane 140, the packet may be flooded. The packet may be flooded for a predetermined time period. Although not shown, the flooding may identify an output port for sending the incoming packet based on the destination address of the incoming packet, and then an entry may be created for the destination address. The entry may be stored in the forwarding information base 108. The entry may also be stored in the forwarding table based on the determinations described with respect to blocks 405 and 407.

At block 405, the control plane 140 determines whether there is unused space in the forwarding table 103*a* for storing the entry found based on the lookup performed on the forwarding information base 108. The forwarding table management module 105 in the control plane 140 may determine whether there is unused space in the forwarding table 103*a* based on the replica of the in the forwarding table 103*a* stored in the forwarding information base 108. In another example, the determination of the block 405 and/or the block 407 may be made by the ASIC 102*a* in the line interface module 104*a*.

At block 406, if the unused space exists, the entry determined from the lookup performed on the forwarding information base 108 is stored in the forwarding table 103*a* and in the replica 109 for the forwarding table 103*a*.

At block 407, if unused space does not exist, the forwarding table management module 105 determines whether to replace an existing entry in the forwarding table 103 with the new entry to minimize future flooding caused by a forwarding table miss. For example, the future flooding may be minimized when the entry to be replaced is determined to be less likely to be used in the future for forwarding incoming packets than the new entry. In one example, information is stored representing how likely each entry may be used in the future. This information may include most recent usage time of the entry, a number of lookup-failure packets received for the entry, a number of learning packets received for the entry, an existence of a directly connected host for the entry, etc. This information is used to determine priorities or weights for the entries, and the new entry may be selected for replacing the existing entry if the new entry has a higher priority or greater weight. For example, a determination is made as to whether there is an existing entry having a lower priority or lower weight than the new entry, or whether there is an existing entry having a lower priority or lower weight than a threshold. Other techniques may be used to identify entries to replace.

At block 408, an entry in the forwarding table 103*a* is replaced with the new entry based on the existing entry to be replaced, which is identified at block 407. Once an entry in the forwarding table 103*a* has been replaced with the new entry, the replica in the forwarding table management module 105 is updated according to the update of the forwarding table 103*a*. The replica in the forwarding table management module 105 is updated whenever there is a change in the corresponding forwarding table so the replica stores the same information as the forwarding table or identifies all the information in the forwarding table.

What has been described and illustrated herein are examples and embodiments. The terms, descriptions and figures used herein are set forth by way of illustration.

What is claimed is:

1. A method for managing a forwarding table in a switch of a computer network, the method comprising:
   determining, by a processor in a control plane, whether a received incoming packet to the control plane is a learning packet or a lookup-failure packet for a destination, wherein the incoming packet has a destination and the lookup-failure packet is a packet that causes a miss for the destination in a forwarding table of a data plane;

upon determining that the incoming packet is a lookup-failure packet:

determining that a forwarding information base includes an entry corresponding to the destination in the incoming packet;

sending the entry to the data plane, wherein the entry is used to forward the incoming packet toward its destination; and inserting the entry into the forwarding table.

2. The method of claim 1, wherein the forwarding information base includes a replica of the forwarding table and the method further comprises:

updating the replica to include changes made in the forwarding table.

3. The method of claim 1, further comprising:

upon determining that the forwarding information base does not include an entry corresponding to the incoming packet, flooding the incoming packet.

4. The method of claim 1, further comprising:

flooding the incoming packet upon the data plane not receiving an entry corresponding to the incoming packet from the control plane within a predetermined period of time.

5. The method of claim 1, further comprising:

flooding the incoming packet; and sending a request to the control plane to determine whether the forwarding information base includes an entry corresponding to the incoming packet.

6. The method of claim 1, further comprising:

determining whether unused space exists in the forwarding table prior to the inserting of the entry into the forwarding table; and upon determining that unused space exists in the forwarding table, inserting the entry from the forwarding information base into the forwarding table.

7. The method of claim 6, further comprising:

upon determining that unused space does not exist in the forwarding table, determining an existing entry in the forwarding table to replace, and replacing the existing entry with the entry.

8. The method of claim 7, wherein the determining of the existing entry in the forwarding table to replace:

is based on priorities of the entries in the forwarding table.

9. The method of claim 1, wherein upon determining that the incoming packet is:

a learning packet from the data plane, wherein the learning packet is a packet with a source address absent in the forwarding table, the method further comprises:

determining an entry to include in the forwarding table based on the learning packet;

determining whether an unused space exists in the forwarding table; and storing the entry in the forwarding table upon determining that unused space exists.

10. The method of claim 9, further comprising:

upon determining that unused space does not exist, storing the entry in the forwarding information base.

11. A switch to manage a forwarding table, the switch comprising:

a processor and memory in a control plane in the switch, the processor to:

determine whether a received incoming packet to the control plane is a learning packet or a lookup-failure packet, wherein the incoming packet has a destination and the lookup-failure packet is a packet that causes a miss for the destination in a forwarding table of a data plane;

upon a determination that the incoming packet is a lookup-failure packet:

determine that a forwarding information base stored in the memory includes an entry corresponding to the destination of the incoming packet;

send the entry to the data plane, wherein the entry is used to forward the incoming packet toward the destination of the packet; and insert the entry into the forwarding table.

12. The switch of claim 11, wherein the forwarding information base includes a replica of the forwarding table and the processor is to update the replica to include changes made in the forwarding table.

13. The switch of claim 11, wherein the incoming packet is flooded upon a determination that the forwarding information base does not include an entry corresponding to the incoming packet.

14. The switch of claim 11, wherein the entry from the forwarding information base corresponding to the incoming packet is inserted in the forwarding table upon a determination that unused space exists in the forwarding table.

15. The switch of claim 11, wherein an existing entry in the forwarding table is replaced with the entry from the forwarding information base corresponding to the incoming packet upon a determination that unused space does not exist in the forwarding table.

16. The switch of claim 15, wherein the existing entry in the forwarding table to be replaced is determined based on priorities of the entries in the forwarding table.

17. The switch of claim 11, wherein the received incoming packet is a learning packet from the data plane, wherein a learning packet is a packet with a source address absent in the forwarding table, and the processor is to determine an entry based in the learning packet to include in the forwarding table.

18. The switch of claim 17, wherein the entry based on the learning packet is stored as a replacement to an existing entry or stored in unused space in the forwarding table.

19. A non-transitory computer readable medium storing computer readable instructions that when executed by a processor performs a method for managing a forwarding table in a switch of a computer network, the instructions to:

determine whether a received incoming packet to a control plane is a learning packet or a lookup-failure packet, wherein the incoming packet has a destination and the lookup-failure packet is a packet that causes a miss for the destination in a forwarding table of a data plane;

upon a determination that the incoming packet is a lookup-failure packet:

determine that a forwarding information base stored in a memory includes an entry corresponding to the destination in the incoming packet;

send the entry to the data plane, wherein the entry is used to forward the incoming packet toward the destination of the packet; and insert the entry into the forwarding table.

20. The non-transitory computer readable medium of claim 19, wherein the instructions to insert the entry into the forwarding table include instructions to replace an existing entry in the forwarding table with the entry, wherein a determination of the existing entry to be replaced is based on priorities of the entries in the forwarding table.

* * * * *

UNITED STATES PATENT AND TRADEMARK OFFICE
CERTIFICATE OF CORRECTION

PATENT NO. : 8,391,289 B1  
APPLICATION NO. : 12/915509  
DATED : March 5, 2013  
INVENTOR(S) : Praveen Yalagandula et al.

Page 1 of 1

It is certified that error appears in the above-identified patent and that said Letters Patent is hereby corrected as shown below:

In the Claims:

In column 9, lines 44-45, in Claim 8, delete "replace:
    is based on priorities of the entries in the forwarding table." and
insert -- replace is based on priorities of the entries in the forwarding table. --, therefor.

In column 9, lines 47-48, in Claim 9, delete "is:
    a learning packet from the data plane, wherein the learning" and
insert -- is a learning packet from the data plane, wherein the learning --, therefor.

Signed and Sealed this  
Twenty-third Day of July, 2013

Teresa Stanek Rea  
*Acting Director of the United States Patent and Trademark Office*